March 1, 1932.   R. J. O. SIMPSON   1,847,906
CYLINDER GAUGE
Filed Sept. 27, 1926   3 Sheets-Sheet 2
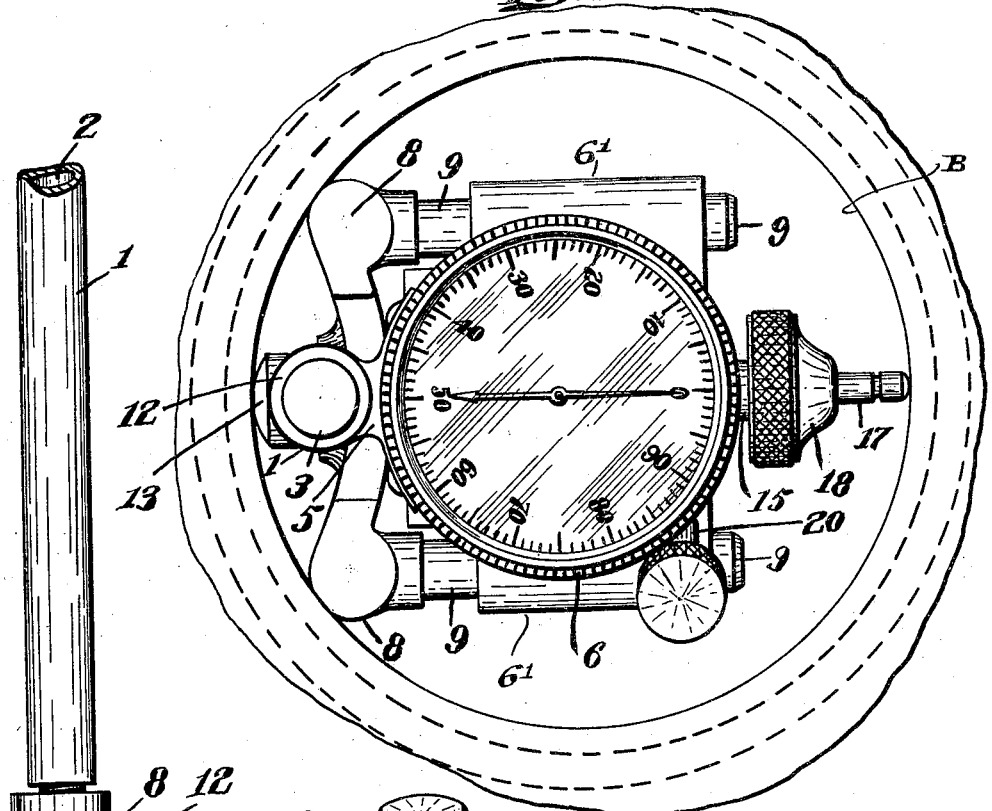
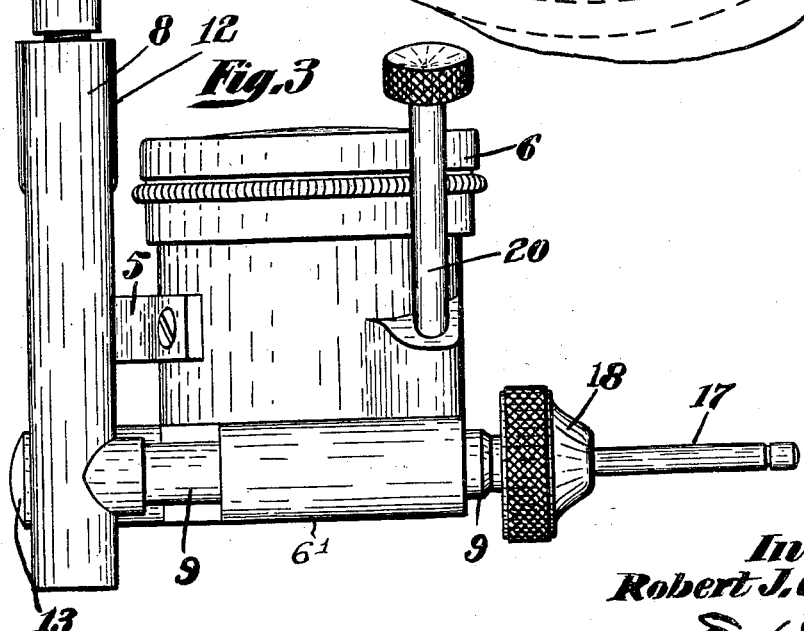
Inventor
Robert J. O. Simpson
By Ellis Spcar Jr.
Attorney

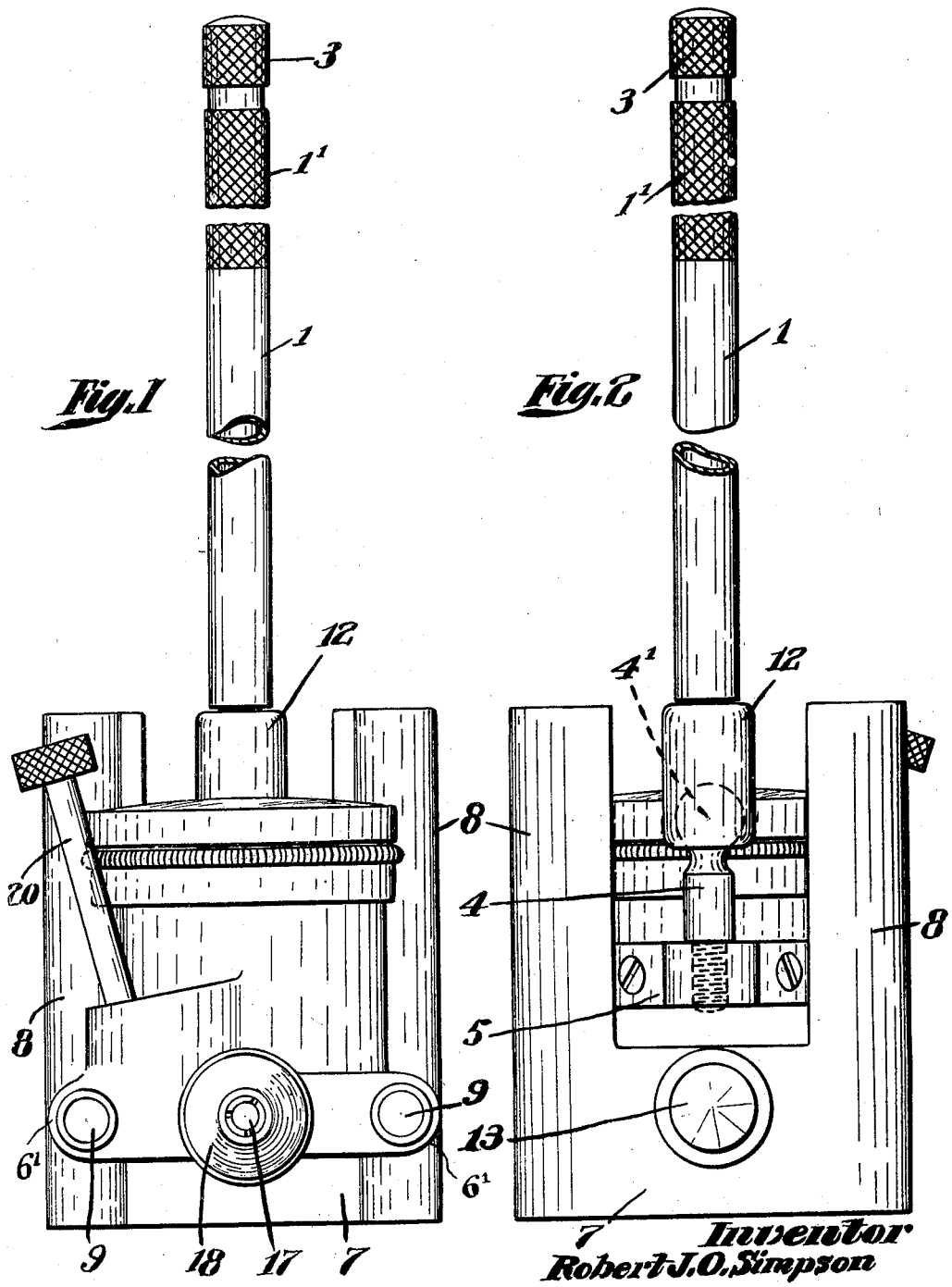

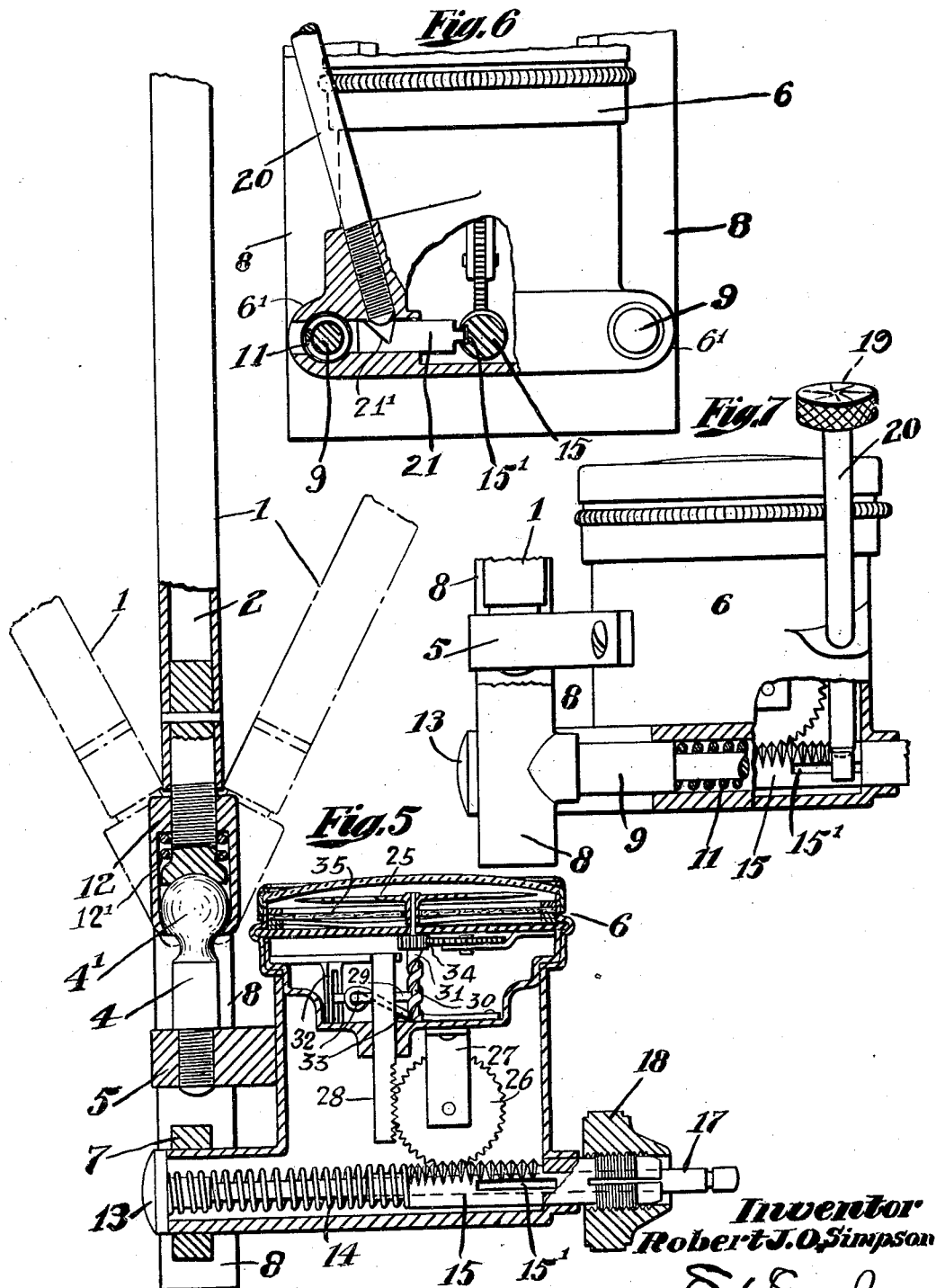

Patented Mar. 1, 1932

1,847,906

UNITED STATES PATENT OFFICE

ROBERT J. O. SIMPSON, OF ATHOL, MASSACHUSETTS, ASSIGNOR, BY MESNE ASSIGN-
MENTS, TO THE L. S. STARRETT COMPANY, A CORPORATION OF MASSACHUSETTS,
ORGANIZED IN 1929

CYLINDER GAUGE

Application filed September 27, 1926. Serial No. 137,917.

My present invention relates to inside micrometers and particularly to that type known as cylinder gauges. Such gauges while adapted to a great variety of interior gauging and testing are particularly adapted for work in cylindrical bores, especially where variations in cylindricity are to be detected and measured, as in internal combustion engines.

In the previous application, Serial No. 583,159, filed August 21, 1922, now Patent No. 1,625,766, granted April 19, 1927, a form of cylinder gauge was shown that has reached a very considerable degree of commercial success. In my present construction I have followed generally the principles involved in my previous invention, combing therewith certain improvements which by their coaction with certain elements of the old device to produce new combinations as well as novel specific advantages.

In some instances difficulty has been experienced in establishing without error the true diameter of the bore tested by indicator of this type. This will be readily understood when it is remembered that these indicators being of the dial type do not actually measure the full diameter but rather indicate variations in that diameter. It has therefore been the custom to make measurements by regauging the indicator with an outside micrometer in order to read the true diameter. In handling the gauges, however, especially where the work is inaccessible or inconveniently exposed, there is opportunity for error in some instances by reason of the fact that when the gauge is withdrawn from the work the dial indicator may have made more than one revolution of movement.

In the handling of my gauges, as well as those of other manufacturers, it has been found convenient under certain circumstances and conditions to give the handle supporting the device a certain degree of movability as in the case of many devices intended to be moved about by a shaft-like handle. Such handles were, therefore, simply loosely coupled to the sled.

While the matter of handle construction may not appear to have relation to that of the measuring function, I here note (and will later explain) a peculiar combinative relation of my improved handle connection which in addition thereto has certain advantages specific to its general functions as a handle.

These features together with a novel locking conception which also joins in the combination above referred to make of my original invention one of greater possibility and new usefulness.

As illustrative of my invention I have shown in the accompanying drawings a cylinder gauge embodying features in accordance with my invention. The form shown is convenient of manufacture and use, and while offered as an illustrative embodiment, it is nevertheless in fact a practical and commercial article. Throughout the specification and drawings like reference characters are employed to indicate corresponding parts, and in the drawings:

Fig. 1 is a front view of such a gauge.
Fig. 2 is a rear view thereof.
Fig. 3 is a side view.
Fig. 4 a plan view of the gauge in the cylinder.
Fig. 5 is a side view in section.
Fig. 6 a front view partly broken away to show the locking device, and
Fig. 7 a side view also broken away and partly sectioned to show the construction of the parts.

Following the general construction of the cylinder gauge shown in my previous application, I provide a handle 1 knurled as at 1' and formed with the spare point chamber 2 which is closed by the plug 3. In my present embodiment this handle is connected to a stud 4 having a ball end 4' and threaded in a bracket 5 on the dial gauge 6. This connection is novel and is to be noted. The gauge 6 is formed with a pair of lateral bearings 6' in which are slidably mounted the studs 9 of a sled or guide 8. The sled 8 is formed as a pair of spaced upright cylinder wall contacting members which are cross-connected near their lower ends by a web 7. The sled 8 is adapted to position the gauge so that its movable spindle or rack bar 15 which carries at one end the feeler point 17. At its other end the contact 13 is always at right angles to the true axis of the bore B, as shown in Fig. 4. The rack bar or spindle 15 is fixed within the base portion of the dial indicator 6 with its inner end extending loosely through the cross web 7 of the sled and exposed therebeyond as the contact member 13 and its outer end extending beyond the edge of the dual indicator base as the contact or feeler point 17. Clamp nut 18 holds feeler 17 in position in the split end of bar 15.

As disclosed in my former application, springs 11 are interposed between shoulders on the studs 9 and the opposite ends of the bearings 6' so that the sled 8 is yieldingly carried by the gauge proper. The combined resistance of these springs 11 is less than that of the spindle spring 14 which when the gauge is within the bore B, as in Fig. 4, assures the seating of the fixed contact point 13 against the cylinder wall before the spindle becomes active on the indicator itself.

Combined with the spindle 15 and in advance of its operating connection with the gauge train is a bolt 21, the inner end of which can be entered into an elongated slot 15' in the spindle. The bolt 21 is operated by the rounded end of a stem 20 which is tapped into the casing of the gauge 6 and has bearing on the forward inclined wall of a notch 21' to give the bolt a thrust.

The importance of mounting the handle 1 on the gauge instead of on its sled will now become apparent.

It will be perceived that it is not only a means of moving the gauge about in the bore B but a means of manipulating the gauge to free its contact point 17 from engagement with the wall of the bore so that it can be tilted and withdrawn even though locked.

Reverting to the handle construction, it will be noted that I have provided a sleeve 12 threaded to the handle 1 which is socketed to receive the ball 4'. I preferably provide a spring 12' to maintain a socket friction within the sleeve or housing 12. It will, therefore, be seen that my handle permits the gauge 6 to be moved, guided and tilted for removal, the sled or guide 8 conforming to the movement of the gauge as directed by the handle. The reciprocation of the rack bar 15 is transmitted to the pointer 25 of the dial indicator as rotary motion by means of a gear segment 26 meshing with the teeth of the rack bar 15 and journaled in a split bearing 27 fast to the under side of the dial indicator casing. The gear segment 26 in turn meshes with the teeth of a vertically disposed rack bar 28 journaled in said dial indicator casing and provided with a transverse pin 29 one end of which is disposed in a spiral groove 30 cut in the pointer barrel 31 and the opposite end of which is guided in a guide 32 fulcrumed on the dial indicator casing. The upward movement of the rack bar 28 is resisted by a coil spring 33 anchored within said casing and engaging the pin 29 at one end. The rotation of the pointer barrel 31 is transmitted to the pointer 25 through a gear train 34 whereby to rotate said pointer over the graduated dial 35 of the indicator.

The individual advantages of the parts will be readily appreciated by those skilled in the art, as will their combined action. While the construction shown represents a high development of operating efficiency and manufacturing possibility, the elements may be employed singly, varied and modified and differently combined after an understanding of the foregoing.

What I therefore claim and desire to secure by Letters Patent is:

1. In a cylinder gauge, a base portion adapted for contact with the interior of a cylinder, an indicator yieldably mounted thereon, a contact element for said indicator and disposed for engagement with the cylinder wall transversely of the cylinder, said indicator and contact being movable transversely relative to said base and having an opposed feeler contact in alinement with said first-named contact, and projectable through said base for cylinder wall contact, and a handle having a universal joint connection with said indicator for adjustment relative thereto.

2. In a cylinder gauge, a base portion adapted for contact with the interior of a cylinder, an indicator yieldably mounted thereon, a contact element for said indicator and disposed for engagement with the cylinder wall transversely of the cylinder, said indicator and contact being movable transversely relative to said base and having an opposed feeler contact in alinement with said first-named contact, and projectable through said base for cylinder wall contact, and a handle having an adjustable connection with said indicator effective in one position of adjustment rigidly to connect the handle to the indicator and in another position of adjustment providing a universal joint connection between said handle and indicator.

3. In a cylinder gauge, a base portion adapted for contact with the interior of a cylinder, an indicator thereon, a contact element for said indicator and disposed for engagement with the cylinder wall transversely of the cylinder, said indicator and contact being movable relative to said base and having an opposed feeler contact in alinement with said first-named contact, and projectable through said base for cylinder wall contact, a handle having a selectively rigid and universal joint connection with said indicator and a locking member for said first named contact element and having an exposed operating portion disposed adjacent the indicator.

4. In a cylinder gauge, a base portion adapted for contact with the interior of a cylinder, an indicator mounted thereon for yielding movement transversely relative thereto, a handle, and a selectively rigid and universal connection between said indicator and handle.

5. In a cylinder gauge, a base portion adapted for contact with the interior of a cylinder, an indicator thereon, and a contact element for said indicator, a locking member engageable with said contact member, a handle, and a ball and socket connection between said indicator and handle and comprising a ball member, a shouldered socket member adapted to contact with the ball, and a housing threaded on said socket member and embracing said ball, and a spring between the shoulder of the socket member and the housing for frictionally holding the threaded adjustment.

6. In a cylinder gauge, a base portion adapted for contact with the interior of a cylinder, a dial indicator thereon, a handle, and a selectively rigid ball and socket connection between said indicator and said handle and comprising a ball member, a shouldered socket member adapted to contact with the ball, and a housing threaded on said socket member and embracing said ball.

7. In a cylinder gauge, a base portion adapted for contact with the interior of a cylinder, a dial indicator thereon, and a contact element for said indicator and disposed for engagement with the cylinder wall transversely of the cylinder, a locking member engageable with said contact element, a handle, and a selectively rigid ball and socket connection between said indicator and handle and comprising a ball member, a shouldered socket member adapted to contact with the ball and a housing threaded on said socket member and embracing said ball.

8. In a cylinder gauge, a base portion adapted for contact with the interior of a cylinder, a dial indicator thereon, and a contact element for said indicator and disposed for engagement with the cylinder wall transversely of the cylinder, said indicator and contact being movable relative to said base and having an opposed feeler contact in alinement with said first-named contact, and projectable through said base for cylinder wall contact, a locking member engageable with said first-named contact element, a handle, and a selectively rigid ball and socket connection between said indicator and handle and comprising a ball member, a shouldered socket member adapted to contact with the ball and a housing threaded on said socket member and embracing said ball.

9. In a cylinder gauge, a base portion adapted for contact with the interior of a cylinder, an indicator mounted on said base for relative yielding movement in a direction transverse thereto, contacts associated with said indicator, and a manipulating handle directly connected with said indicator.

10. In a cylinder gauge, a base portion adapted for contact with the interior of a cylinder, an indicator mounted on said base for relative yielding movement in a direction transverse thereto and having a bracket, contacts associated with said indicator, and a manipulating handle directly connected with said bracket of the indicator.

11. In a cylinder gauge, a base portion adapted for contact with the interior of a cylinder, an indicator mounted on said base for relative yielding movement in a direction transverse thereto and having a bracket providing a vertically disposed bearing, point contacts associated with said indicator, a stud disposed in said bearing and provided with a rounded head, and a manipulating handle having a socket receiving said rounded head.

12. In a cylinder gauge, a base portion adapted for contact with the interior of a cylinder, and an indicator mounted on said base for relative yielding movement in a direction transverse thereto and having a pointer, contacts associated with said indicator, one of said contacts being movable to actuate said pointer, a motion transmitting connection between said movable contact and the pointer of the indicator having a locking slot, a locking bolt disposed beneath said pointer and adapted to enter said slot, and an externally disposed stem for operating said bolt.

13. In a cylinder gauge, a base portion adapted for contact with the interior of a cylinder, an indicator mounted on said base for relative yielding movement in a direction transverse thereto and having a pointer, contacts associated with said indicator, a motion transmitting connection between one of said contacts and the pointer of the indicator and having a locking slot, a locking bolt adapted to enter said slot, and an externally disposed stem for operating said bolt, said indicator also having a bracket providing a vertical bearing, a stud engaged in said bearing and having a rounded head and a handle having a socketed sleeve engaging said rounded head.

14. In a cylinder gauge, a base portion adapted for contact with the interior of a cylinder, an indicator mounted on said base for relative yielding movement in a direction transverse thereto and having a pointer, contacts associated with said indicator, one of said contacts being movable to actuate said pointer, motion transmitting connections between said movable contact and the pointer of the indicator including a rack bar provided with a locking slot, a locking bolt disposed beneath said pointer and disposed at substantially right angles to said contact element and adapted to enter said slot, and an externally disposed stem for operating said bolt.

15. In a cylinder gauge, a base portion adapted for contact with the interior of a cylinder, an indicator mounted on said base for relative wielding movement in a direction transverse thereto and having a pointer, contacts associated with said indicator, motion transmitting connections between one of said contacts and the pointer of the indicator including a rack bar provided with a locking slot, a locking bolt disposed at substantially right angles to said contact element and adapted to enter said slot, and an externally disposed stem for operating said bolt, said indicator also having a bracket providing a vertical bearing, a stud engaged in said bearing and having a rounded head and a handle having a socketed sleeve engaging said rounded head.

16. In a cylinder gauge, a base portion adapted for contact with the interior of a cylinder, a dial indicator mounted on said base portion for relative yielding movement, a pair of alined contacts associated with said indicator, one of said contacts being movable to actuate the indicator, the dial of said indicator being above the base portion and contacts, a locking bolt for said one contact and an operating stem for said bolt having an exposed operating portion disposed adjacent to the dial indicator and slightly above the plane of the dial.

17. In a cylinder gauge, a base portion adapted for contact with the interior of a cylinder, a dial indicator mounted on said base portion for relative yielding movement, a pair of alined contacts associated with said indicator, one of said contacts being movable to actuate the indicator, the dial of said indicator being above the base portion and contacts, a locking bolt for said one contact and an operating stem for said bolt having an exposed operating portion disposed adjacent to the dial indicator and slightly above the plane of the dial, said operating stem extending at an angle to the plane of the dial indicator.

18. In a cylinder gauge, a base portion adapted for contact with the interior of a cylinder, a dial indicator mounted on said base portion for relative yielding movement, a pair of alined contacts associated with said indicator, one of said contacts being movable to actuate the indicator, the dial of said indicator being above the base portion and contacts, a locking bolt for said one contact and an operating stem for said bolt disposed exteriorly of the dial indicator and extending in the general direction of the base portion and having an exposed operating portion adjacent the dial of said indicator.

19. In a cylinder gauge, a base portion adapted for contact with the interior of a cylinder, a dial indicator mounted on said base portion for relative yielding movement, a pair of alined contacts associated with said indicator, one of said contacts being movable to actuate the indicator, the dial of said indicator being above the base portion and contacts, a locking bolt for said one contact and an operating stem for said bolt arranged at one side of the dial indicator and having an exposed operating portion adjacent the dial of said indicator.

20. In a cylinder gauge, a positioning base adapted for contact with the interior of a cyinder longitudinally thereof, an indicator mounted on said base and having a pointer, an elongated pointer actuating member mounted in said indicator beneath said pointer, a pair of spaced alined contacts disposed in a plane transverse to the plane of said positioning base and at either end of said pointer actuating member, one of said contacts exposed beyond said indicator for cylinder wall contact and being movable to actuate said pointer actuating member and the other of said contacts being exposed beyond said positioning base for contact with the cylinder wall diametrically opposite the point of contact therewith of the first-named contact, a locking bolt for said pointer-actuating member, and an operating stem for said bolt disposed exteriorly of the indicator and extending in the same general direction as said positioning base.

21. In a cylinder gauge, a positioning base adapted for contact with the interior of a cylinder longitudinally thereof, an indicator mounted on said base and having a pointer, an elongated pointer actuating member mounted in said indicator beneath said pointer, a pair of spaced alined contacts disposed in a plane transverse to the plane of said positioning base and at either end of said pointer-actuating member, one of said contacts exposed beyond said indicator for cylinder wall contact and being movable to actuate said pointer actuating member and the other of said contacts being exposed beyond said positioning base for contact with the cylinder wall diametrically opposite the point of contact therewith of the first-named contact, a locking bolt for said pointer-actuating member, an operating stem for said bolt disposed exteriorly of the indicator and extending in the same general direction as said positioning base, a manipulating handle, and an adjustable connection directly connecting said handle to said indicator which connection when in one position of adjustment provides a rigid connection between the handle and indicator and which connection when in another position of adjustment provides a universal joint connection between the handle and indicator.

22. In a cylinder gauge, a positioning base, an indicator thereon, a manipulating handle, and an adjustable connection directly connecting said handle to said indicator which connection when in one position of adjustment provides a rigid connection between the handle and indicator and which connection when in another position of adjustment provides a universal joint connection between said parts.

23. In a cylinder gauge, a positioning base presenting a pair of spaced lineal contacting elements, an indicator mounted on said base, a manipulating handle disposed between said spaced contacting elements and an adjustable connection directly connecting said handle to said indicator which connection when in one position of adjustment provides a rigid connection between the handle and indicator and which connection when in another position of adjustment provides a universal joint connection between said parts.

24. In a cylinder gauge, a positioning base presenting a vertically extending pair of spaced lineal contacting elements, an indicator mounted on said base and having a horizontally extending portion terminating in a vertically extending engaging element disposed in the space between said lineal contacting elements, and a manipulating handle directly connected with said vertically extending engaging element of the indicator.

25. In a cylinder gauge, a positioning base presenting a vertically extending pair of spaced lineal contacting elements, an indicator mounted on said base and having a horizontal extending portion terminating in a vertically extending engaging element disposed in the space between said lineal contacting elements, and a manipulating handle directly connected with said vertically extending engaging element of the indicator, said handle having a rotatively adjustable connection with said indicator which when in one position of adjustment provides a rigid connection between the handle and indicator and which when in another position of adjustment provides a universal joint connection between said parts.

In testimony whereof I affix my signature.

ROBERT J. O. SIMPSON.